United States Patent [19]
Leko

[11] 3,909,019
[45] Sept. 30, 1975

[54] GASKETS

[76] Inventor: Toma D. Leko, c/o Portner, 12507 Davan Dr., Silver Spring, Md. 20904

[22] Filed: May 25, 1973

[21] Appl. No.: 356,896

[30] Foreign Application Priority Data
June 14, 1972 Germany............................ 2228933
Sept. 27, 1972 Germany............................ 2247372

[52] U.S. Cl.............................. 277/209; 277/235 A
[51] Int. Cl................................................ F02f 11/00
[58] Field of Search ........... 277/211, 209, 193, 236, 277/180, 207, 213, 235 A, 192

[56] References Cited
UNITED STATES PATENTS

| | | | |
|---|---|---|---|
| 926,841 | 7/1909 | Bartlett................................ | 277/213 |
| 2,239,641 | 4/1941 | Bierend................................ | 277/209 |
| 2,809,130 | 10/1957 | Rappaport....................... | 277/235 A |
| 3,188,100 | 6/1965 | Delgado........................... | 277/235 A |
| 3,481,715 | 12/1969 | Whalen et al.................... | 277/235 A |

OTHER PUBLICATIONS
Goetze Gasket Chart; by Goetze Gasket and Packing Co. Inc., New Brunswick, N.J. Circa 11/17/1944.

*Primary Examiner*—Richard E. Aegerter
*Assistant Examiner*—Willis Little

[57] ABSTRACT

Gaskets including stacked ribbed and flat sheet metal plates with increased resiliency in a direction at right angle to the gap to be sealed. Ribbed plates having curved ribs on both faces, with ribs on one face of the plate being staggered in relation to the ribs on the other face of the plate. The ribbed plates produced out of composite plates consisting of a spring-steel core coated on both faces with nonferrous outer layers, preferably copper or aluminum, and the ribs etched out of outer layers.

In modified structures the ribs are produced either by etching out of a solid spring-steel plate and jacketed with a softer material or by molding upon a flat spring-steel core.

3 Claims, 7 Drawing Figures

GASKETS

This invention relates to improvement in gaskets. Essentially, the invention aims to improve the recovery of the gasket. For a satisfactory performance of a gasket its resiliency is of primary importance. The sealability of a joint is dependent on the ability of the gasket to follow the inherent thermal, mechanical and vibrational deformations of the flanges. Heretofore gaskets have been provided with ribs or ridges stuck up from the sheet of gasket material itself, or with various springs embedded in a grommet encircling the opening.

The gasket of this invention aims to provide high resiliency in a small volume available for sealing purposes, by using one or more ribbed metal plates having curved ribs on both faces thereof, and with ribs on one face of the plate being in staggered relation to the ribs on the opposite face of the plate.

With these and other objects in view, the invention consists substantially of the devices illustrated in the accompanying drawings together with such modifications thereof as come within the scope of the invention as defined in the appended claims.

Figure 1:
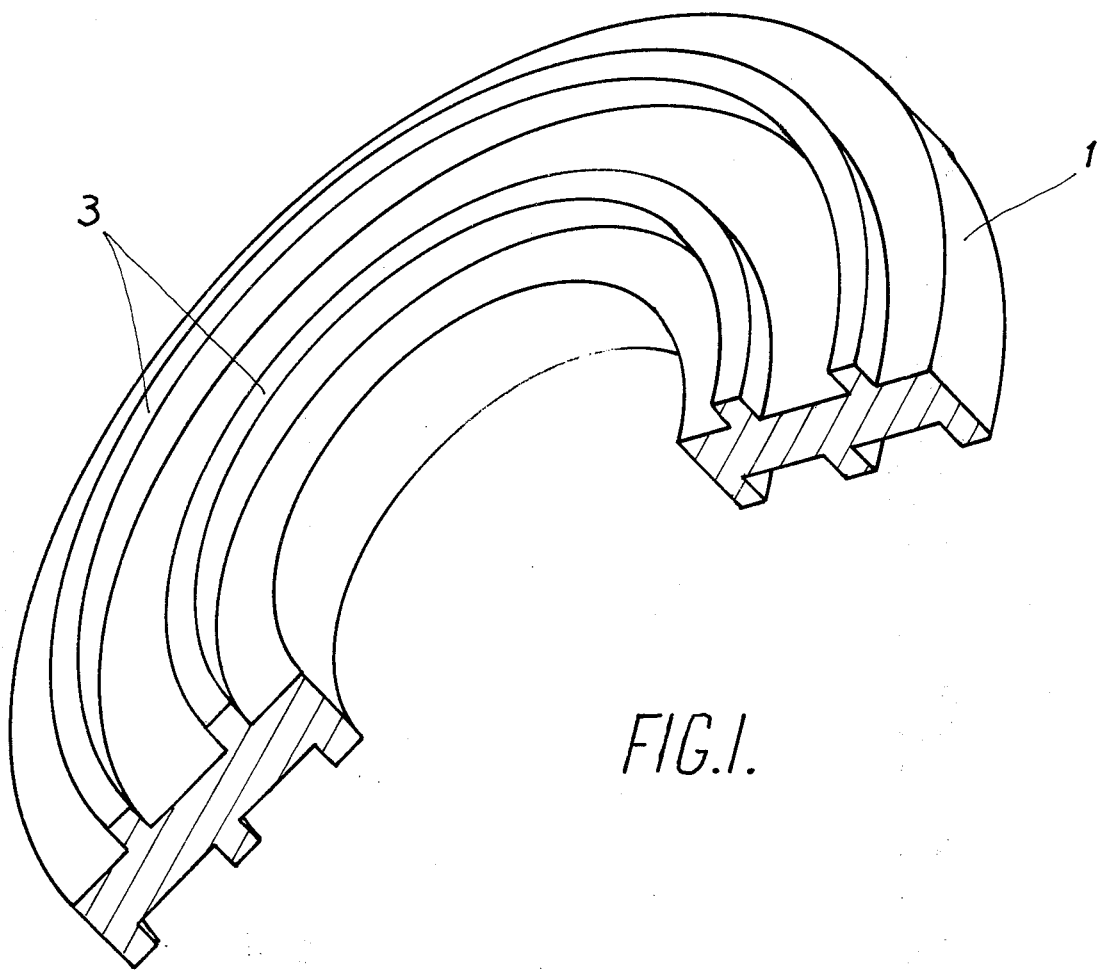
FIG. 1 is a perspective view of a part of a sheet metal plate which forms one of the elements of the gasket.

In FIG. 1 the plate 1 is provided with a number of curved ribs 3 on both faces of the plate 1. The ribs are in such spaced relationship to one another so as to leave between the adjacent ribs a certain unsupported plate portion so that the stack may be compressed under the conditions of load. In other words, the ribs on either face of the plate 1 are staggered in respect to each other. The curved ribs 3 are produced by known etching techniques, and may be made as deep or as shallow as desired, depending upon the load conditions for which the gasket is intended.

Figure 2:
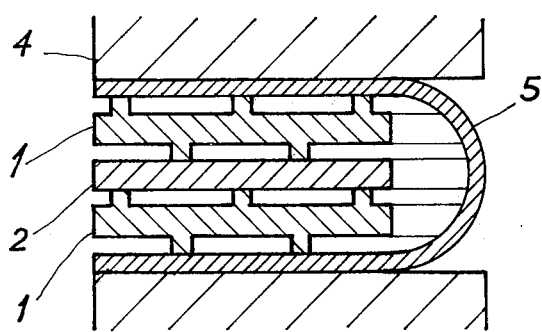
FIG. 2 is a view in cross-section of a stack of elements such as that illustrated in FIG. 1, showing the relative position of the elements when no load is applied.

The stacking of ribbed sheet metal plates 1 in FIG. 1 with the flat spring metal plates 2 as illustrated in FIG. 2. By this arrangement the flat portions of the plates in between the ribs will be flexed so that under the load the stack will look in cross-section substantially the way it is illustrated in FIG. 3.

Figure 3:
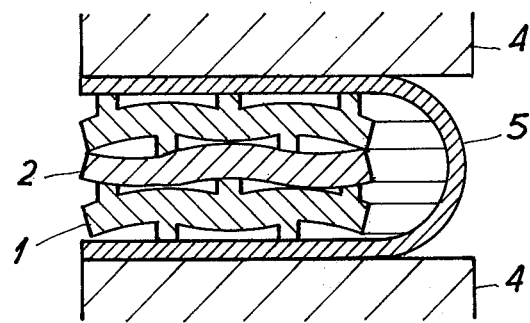
FIG. 3 is a view similar to FIG. 2 showing the relative position of the elements of the stack under load.

In FIGS. 2 and 3, the reference numeral 4 indicates diagrammatically load members which are resting on the top and the bottom surface of the grommet 5 embracing the peripheral margin of the gasket surrounding the opening to be sealed.

Figure 4:
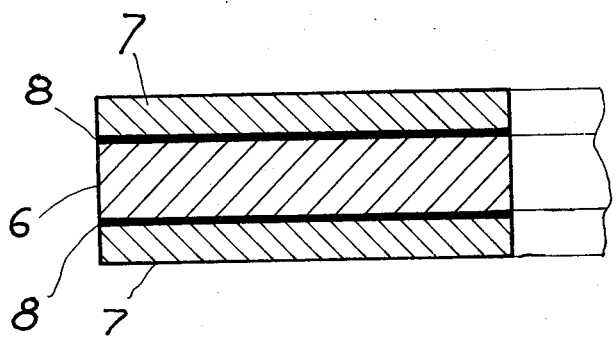
FIG. 4 is a view in cross-section of a composite plate element before etching.

FIG. 4 is a view in cross-section of a composite plate element. It consists of a spring-steel plate 6 coated on both faces with a non-ferrous foil 7, preferably copper or aluminum. The laminate is produced by any of the known techniques and may contain adhesive layers 8 between the steel plate 6 and the non-ferrous covering 7.

Figure 5:
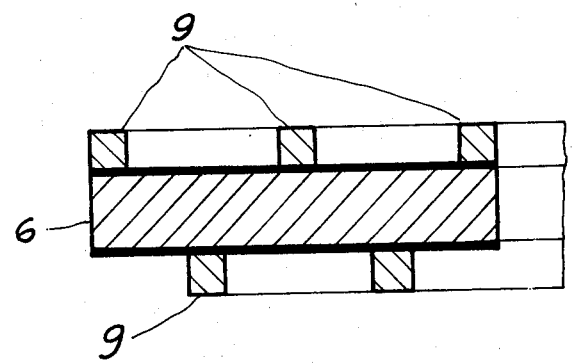
FIG. 5 is a view in cross-section of a composite plate element after etching.

FIG. 5 shows the composite plate element in FIG. 4 with etched ribs 9 in the non-ferrous coverings.

When the composite plate consists of a steel plate 6 covered with plastic layers 7 the ribs are produced either by chemical etching or by using the presensitized plastic layers and the known photographic developing techniques.

Figure 6:
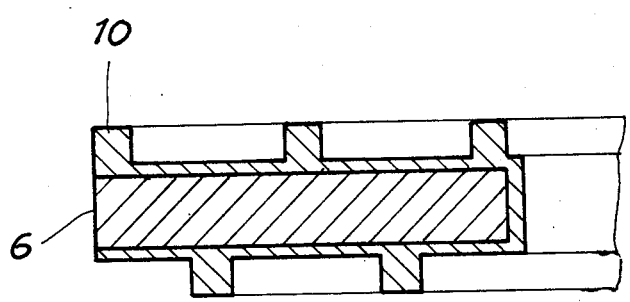
FIG. 6 is a view similar to FIG. 5 showing a composite plate element produced by moulding.

FIG. 6 is a view in cross-section of a composite ribbed plate element when the plastic layer 10 is produced by moulding.

Figure 7:
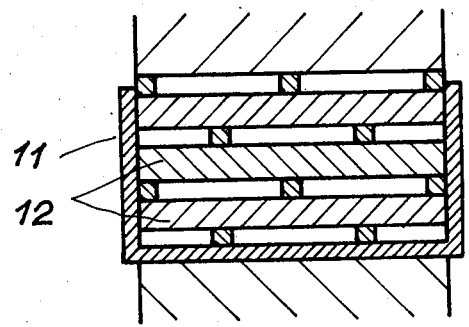
FIG. 7 shows one form of stacking the elements with means for maintaining the plates in stacked relation.

FIG. 7 shows one method of assembling the plates into a stack. The stack is placed in a guide chamber or a receptacle 11 which serves to keep the plates 12 in proper stacked relation.

I claim as my invention:

1. A gasket comprising ribbed metal plates in the form of an opening to be sealed, the ribs on said ribbed metal plates extending curvilinearly along both faces thereof, said ribs on one face being in staggered relation to the ribs on the opposite face, and flat metal plates having no ribs on either face thereof, said ribbed metal plates being stacked in said opening with a different one of said flat metal plates being disposed intermediate each pair them and in contact relationship therewith, and a grommet embracing the peripheral margin of the gasket surrounding said opening to be sealed.

2. A gasket comprising resilient composite ribbed plates shaped in the form of an opening to be sealed, said composite ribbed plates having a spring-steel core and non-ferrous metal outer layers, the ribs on said composite ribbed plates extending curvilinearly along both faces thereof, said ribs on one face being in staggered relation to the ribs on the opposite face, and flat metal plates having no ribs on either face thereof, said composite ribbed plates being stacked in said opening with a different one of said flat metal plates being disposed intermediate each pair them and in contact relationship therewith, and means for maintaining said plates in said stacked relation.

3. A gasket comprising resilient composite ribbed plates shaped in the form of of an opening to be sealed, said composite ribbed plates having a spring-steel core and plastic outer layers, the ribs on said composite ribbed plates extending curvilinearly along both faces thereof, said ribs on one face being in staggered relation to the ribs on the opposite face, and flat metal plates having no ribs on either face thereof, said composite ribbed plates being stacked in said opening with a different one of said flat metal plates being disposed intermediate each pair of them and in contact relationship therewith, and means for maintaining said plates in said stacked relation.

* * * * *